Feb. 2, 1965                W. W. GUNKEL ETAL                3,168,145
                        BEAN HARVESTING ATTACHMENT

Filed Jan. 4, 1963                                    2 Sheets-Sheet 1

INVENTORS
WESLEY W. GUNKEL
LEON LAVERN ANSTEE

By

ATTORNEY

Feb. 2, 1965 W. W. GUNKEL ETAL 3,168,145
BEAN HARVESTING ATTACHMENT
Filed Jan. 4, 1963 2 Sheets-Sheet 2
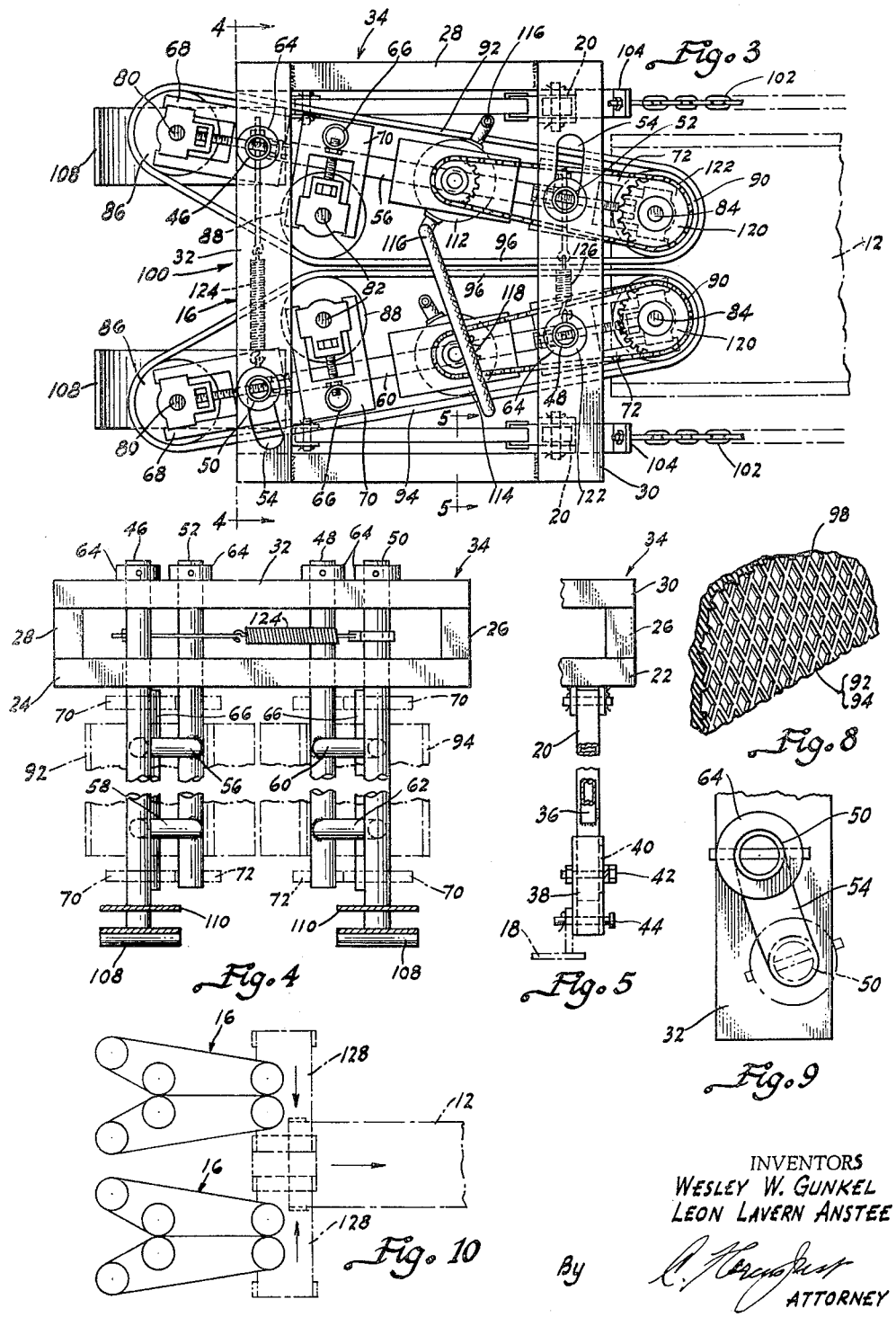
INVENTORS
WESLEY W. GUNKEL
LEON LAVERN ANSTEE
By
ATTORNEY United States Patent Office 3,168,145
Patented Feb. 2, 1965

3,168,145
BEAN HARVESTING ATTACHMENT
Wesley W. Gunkel, 1101 Hanshaw Road, Ithaca, N.Y., and Leon Lavern Anstee, 2400 New Holland Pike, Lancaster, Pa.
Filed Jan. 4, 1963, Ser. No. 249,472
9 Claims. (Cl. 171—61)

This invention relates to a bean harvesting attachment for use on a conventional bean combine harvester and, more particularly, the invention pertains to such bean harvesting attachment especially effective in regard to harvesting beans standing in a field in relatively dry condition, such beans being well suited for direct threshing by a bean harvesting combine when fed thereto directly upon being removed from the field.

The efficient harvesting of beans presents a number of problems, certain of which are due primarily to the fact that when bean plants stand in the field ready for harvest, especially in dry condition, the pods of such plants are highly susceptible to shattering when subjected even to slight agitation. Shattered bean pods cause various percentages of the beans to be dropped upon the ground, depending upon how badly the shattering occurs. As a result of this, it has been rather common practice for many years to harvest beans when the vines are not quite thoroughly dry, whereby substantially no shattering takes place when the beans are cut or otherwise removed from the soil. Under such circumstances, the pods are not sufficiently dry to be brittle, and therefore they will sustain a reasonable amount of handling, such as by raking cut or pulled bean vines, with a side-delivery rake, for example, into windrows. Usually, a number of rows of bean vines are raked into a common windrow. After a limited period, such as one or two days, of good drying weather, the bean vines usually are sufficiently dry to be fed to a bean harvesting combine, in which they directly are threshed, in accordance with conventional practice.

Inclement weather can play a definite factor frequently in the practice of the above-described harvesting techniques employed in relation to the bean growing industry. If wet weather occurs while the beans are raked into a windrow, molding and other forms of spoilage can and do occur, thereby reducing the profit aspect of the harvest.

Attempts have been made previously to directly harvest, i.e., pull or cut, bean plants directly from the field, and feed them to a combine in which they are threshed. Most of these attempts have not been successful, however, due particularly to the rather high percentage of shattering which occurs incident to harvesting the beans on the bean vines, especially before they enter the threshing combine. The very operation of pulling or cutting the bean vines from the ground frequently causes such a high degree of shattering that such operations have not been considered sufficiently satisfactory to warrant widespread adoption by the bean industry.

It is the principal object of the present invention to provide a bean harvesting attachment directly connectable to the forward end of a conventional bean harvester, said attachment being provided with means which envelop substantially the entire bean vine as the harvester advances along a row of beans, or along a plurality of rows of beans, if the harvester is of the multi-row type, and while holding the bean vines thus enveloped, they preferably are pulled from the soil and then elevated progressively into the receiving means of the bean combine with a minimum amount of loss from shattering prior to the bean vines reaching the combine delivery means.

It is another object of the invention to actuate the bean vine enveloping mechanism in such manner that the bean vines not only are elevated in a vertical direction, but also are pulled rearwardly, relative to the direction of movement of the harvesting mechanism, thereby facilitating the removal of the bean vines from the soil with a minimum amount of shattering of the dried bean pods hanging upon the vines.

A further object of the invention is to provide the bean vine enveloping means with surfaces which not only provide maximum frictional gripping of the vines while pulling and elevating the same, but also afford a maximum retention of any beans or pods which may have become separated from the vines while being removed from the soil by engagement therewith of the bean vine enveloping means, said surface arrangement being such as to retain an exceptionally high percentage of any beans which have been shattered from the dried pods until the enveloping means discharges the bean vines and any incidentally shattered beans into the combine receiving mechanism.

Still another object of the invention is to provide relatively simple, but highly effective and durable, mechanism comprising a pair of endless belts disposed with portions of the courses of said belts in parallel arrangement, and preferably in firm engagement with each other along a vertical plane, the path of said portions of the courses in a longitudinal direction being upward and rearward relative to the direction of movement of the harvesting attachment and combine while performing the desired harvesting operation.

A still further object of the invention ancillary to the foregoing object is to provide highly effective and relatively simple mechanism for yieldingly urging said portions of the courses of said belts into firm engagement with each so as to provide therebetween a space within which bean vines are accommodated incident to being pulled from the soil and feed to the combine receiving mechanism, the material from which the belts are formed preferably being yieldable to a limited extent so as to accommodate varying bulks of bean vines, within reasonable limits, while still affording firm frictional engagement with opposite sides of a row of bean vines so as to pull the same from the soil and feed them to the combine receiving mechanism.

Still another object of the invention is to provide effective and inexpensively operated driving mechanism for the belts referred to in the preceding objects, such drive of the belts preferably being independent of the drive means for the threshing combine.

Details of the foregoing objects and of the invention, as well as other objects thereof, are set forth in the following specification and illustrated in the accompanying drawings comprising a part thereof.

In the drawings:

FIG. 3 is a top plan view of the bean harvesting attachment shown in FIG. 2, as seen from the line 3—3 of FIG. 2.

FIG. 4 is a vertical, sectional view, as seen on the line 4—4 of FIG. 3, this figure being broken away horizontally in the middle to permit foreshortening of the view.

FIG. 5 is a vertical, section view, foreshortened similarly to the manner employed in FIG. 4, of a portion of the attaching and bracing mechanism, as seen on the line 5—5 of FIG. 3.

FIG. 8 is a fragmentary, perspective view of a portion of a preferred design of contour on one surface of the endless belts comprising an essential part of the present invention.

FIG. 9 is an exemplary fragmentary plan view showing, in full lines one position of the cantilever type supporting means for one of the auxiliary frames which supports one of the endless belts and, in phantom, the same means is shown in an extended position in which it supports the sub-frame, as when the frame has been caused to yield due to abnormal bulkage being encountered by the endless belts.

FIG. 10 is an exemplary plan view on a very small scale illustrating the manner in which a plurality of pairs of endless belts may be employed in a single harvesting attachment so as simultaneously to harvest a plurality of rows of beans.

Figure 1:
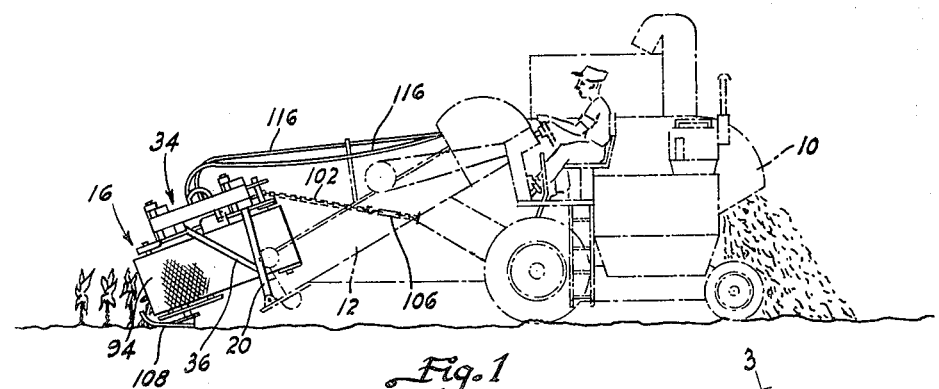
FIG. 1 is an exemplary side elevation, in relatively small scale, showing in phantom a conventional bean threshing combine, to the forward end of which a bean harvesting attachment is connected, the latter being illustrated in full lines so as to render the operation of the harvesting attachment relative to the thresher more readily apparent.

Referring to the drawings, and particularly FIG. 1, a conventional bean harvesting combine 10 is shown in exemplary manner, in phantom, as it appears moving along a bean field to be harvested. The forward end of the combine 10 is provided with a receiving and elevating chute 12, having an appropriate elevating belt 14, see FIG. 2, moving along the lower surface thereof for purposes of receiving bean vines which have been removed from the soil of the field being harvested. Connected to the forward, lower end of the chute 12 is a bean harvesting attachment 16 comprising the present invention. The principal purpose of the harvesting attachment 16 is to engage successively the individual vines of a row thereof as they occur in a field, substantially completely envelop the bean vines which are in dried condition and have dried pods of beans adhering thereto, remove the same from the soil by pulling the vines in a predetermined manner to be described in detail hereinafter, and elevate said vines while minimizing shattering thereof so as to discharge them into the receiving and elevating chute 12 of the combine 10.

The harvesting attachment 16 may be connected to an appropriate bracket 18 provided at the forward end of the frame of the chute 12 through the means of the rear vertical strut 20, of which there is one at each of the opposite sides of the unit comprising an individual harvesting arrangement for a single row of beans. The struts 20 at opposite sides of the harvesting unit, as is best shown in FIG. 3, are connected at their upper ends to the opposite ends of a rear horizontal frame member 22. At the forward end of the harvesting attachment unit, there is another similar forward horizontal frame member 24, which is parallel to member 22. Substantially parallel side frame members 26 and 28 extend between the members 22 and 24 and are substantially at right angles thereto, as is best shown in FIG. 3.

Figure 2:
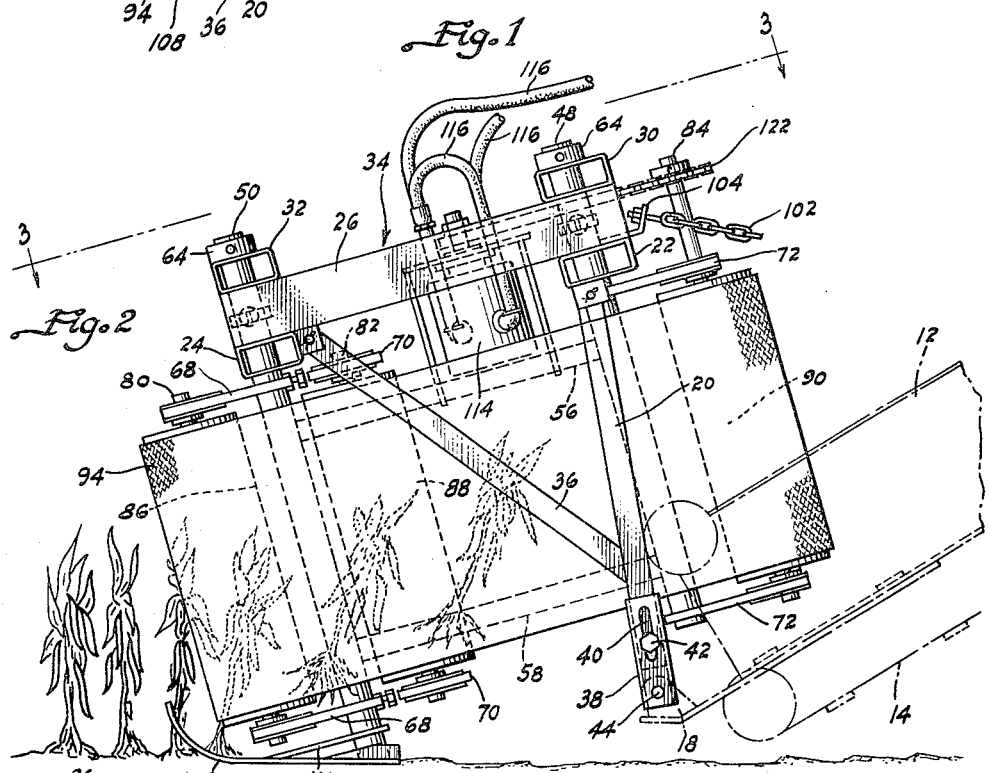
FIG. 2 is a view similar to the left-hand portion of FIG. 1 for purposes of illustrating, on a larger scale than in FIG. 1, details of the bean harvesting attachment comprising the present invention, the forward end of the combine being fragmentarily illustrated in phantom in this figure.

Disposed on top of the opposite ends of side frame members 26 and 28 are a pair of upper rear and forward transverse frame members 30 and 32, the same respectively being parallel to the frame members 22 and 24. All of the various horizontal, side, and transverse frame members referred to immediately above are rigidly connected together, such as by welding or otherwise, to comprise an overhead frame 34, and the forward end thereof is braced relative to the vertical struts 20 by means of angular braces 36, which are best shown in FIG. 2. The rearward, lower ends of the braces 36 are connected such as by welding or otherwise to the lower portions of the vertical struts 20.

For purposes of permitting a limited amount of vertical adjustment of the overhead frame 34 relative to the elevating chute 12 of the combine 10, the lower ends of struts 20 are connected to any suitable adjusting means, such as a sleeve 38 which, for example, may be rectangular in cross-section and complementary to the exterior of the lower end of strut 20, sleeve 38 having a slot 40 therein through which a clamping bolt 42 extends. The lower end of adjusting sleeve 38 is connected to the bracket 18 therefor by means of a suitable pin or bolt 44, as best shown in FIGS. 2 and 5.

Depending from the overhead frame 34 is a plurality of cantilever members 46 and 48, which are mounted at their upper ends in axially aligned bearing openings formed respectively in the forward and rearward transverse frame members 24, 32 and 22, 30, whereby said members 46 and 48 have a limited amount of rotary movement about their axes for purposes to be described. There also is a plurality of similar cantilever members 50 and 52, which are movable through limited arcs defined by short, slightly arcuate guide slots 54 formed respectively adjacent the opposite ends of the forward and rearward vertical pairs of transverse frame members 24, 32 and 22, 30. The guide slots 54 are best shown in their relative positions in FIG. 3, and details thereof are best illustrated individually in FIG. 9 relative to one of said guide slot arrangements.

The cantilever members 46–52 comprise supporting means for a pair of auxiliary frames respectively disposed at opposite sides of a vertical, longitudinal median plane extending along each of the attachment units of the general arrangement shown, for example, in FIG. 3, in which it can be visualized that said median plane extends longitudinally of the harvesting attachment unit 16. These frames respectively are relatively simple, and one of the frames comprises a pair of substantially parallel and vertically spaced frame struts 56 and 58, which extend between and are connected at their opposite ends to the cantilever members 46 and 52, while the opposite sub-frame comprises a similar pair of frame struts 60 and 62 extending between and being connected at their opposite ends to the cantilever members 48 and 50, all as best shown in FIG. 4. The struts referred to may be connected to the various cantilever members by any appropriate means, such as welding, which will render said sub-frames relatively rigid. The rigidity also will be enhanced by the supporting means for the upper ends of the cantilever members which comprise locking and positioning collars 64, which are connected, such as by set screws, to the upper ends of the cantilever members which project through the transverse overhead frame members 30 and 32.

The aforementioned sub-frames also each comprise an intermediate vertical frame member 66, said members being connected by welding or other suitable means to the substantially horizontal frame struts 56–62 of said two sub-frames. It thus will be seen that one sub-frame comprises the cantilever members 46 and 52, frame struts 56 and 58, and intermediate vertical frame member 66; while the other sub-frame comprises cantilever members 48 and 50, frame struts 60 and 62, and an intermediate vertical frame member 66.

Figure 6:
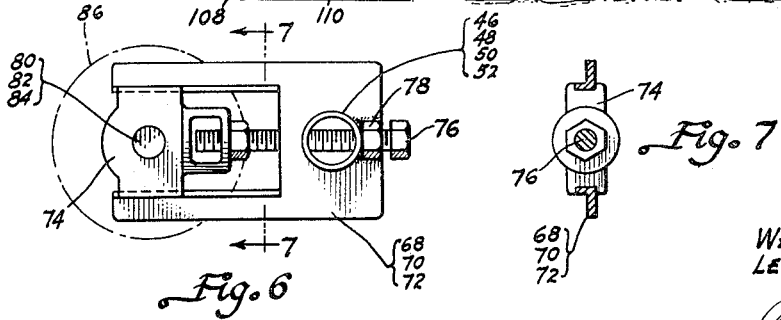
FIG. 6 is a top plan view, shown in a still larger scale than in FIGS. 2–4, of exemplary belt-tightening mechanism employed in the accordance with the invention.
Figure 7:
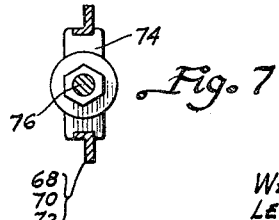
FIG. 7 is a vertical, sectional view, taken on the line 7—7 of FIG. 6.

The above-described skeletal-like sub-frames each support vertically spaced pairs of brackets 68, 70 and 72, which, individually, are substantially U-shaped in plan view, as best shown in FIG. 6, and each of them have a guided bearing block 74 mounted therein. Said bearing blocks are longitudinally movable within the space between the opposite legs of the U-shaped brackets 68, 70 and 72, by means of a threaded bolt 76, which is rotatably carried by a fixed threaded member, such as a nut 78. The base portion of the brackets 68, 70 and 72 respectively are secured, such as by welding or otherwise, to the cantilever members 46–52 and intermediate vertical frame member 66, as indicated generally in FIG. 6, and the threaded nut 78 with which the adjusting bolt 76 is connected likewise is fixed by welding or the like to such cantilever or intermediate vertical frame members.

The function of these various vertically spaced pairs of brackets 68, 70 and 72, and particularly the guided bearing block 74 therein, is to support the opposite ends of axles 80, 82 and 84 to which belt guiding and supporting rolls 86, 88 and 90 respectively are connected.

Extending around the rolls 86, 88 and 90, which are supported by each of the sub-frames is one of a pair of similar endless flexible belts 92 and 94, which preferably are of a suitable frictional character as to be able to firmly grasp bean vines between the paralell portions 96 of the courses of said belts, as best shown in FIG. 3. There are various type of commercial belting which are suitable for this purpose, some of the same being formed from rubber, either reinforced by suitable fabric or otherwise, the preferred essential characteristic of such belts, however, being that they are impervious. An added improvement of the belts comprises a somewhat reticulated arrangement 98 on one face of the belts 92 and 94, as shown in exemplary manner in FIG. 8, whereby a plurality of crossed ribs define segregated spaces therebetween, which afford convenient means to retain any beans which have been shattered from the vines during the pulling of the same from the soil in which they have been growing. Further, the crossed ribs which define the recesses of the reticulated surface 98 provide excellent friction means for engaging the bean vines to pull them from the soil.

As a result of providing the brackets 68, 70 and 72 of the two sub-frames with adjustable bearings 74, it will be seen especially from FIG. 3 that it is conveniently possible to operate the adjusting bolts 76 so as to not only tension the endless belts 92 and 94 respectively about the supporting rolls therefor, but it also will be seen that the supporting rolls on each of the sub-frames define a generally triangular arrangement, in plan view, as also is evident from FIG. 3, whereby the distance between the parallel portions 96 of the belts may be adjusted, for example, to dispose the same in direct contact with each other, if desired, or so as to have a limited spaced therebetween, as desired, especially depending upon the thickness of the row of vines being harvested in a given field. Further, such triangular arrangement of the rolls of each of the sub-frames disposes the forward portion of the cooperating belts, as considered in relation to the direction of travel of the harvester, so as to provide a V-shaped entrance mouth 100, indicated generally in FIG. 3, which guides the bean vines into position between the parallel courses 96 of the belts.

Considered in plan view per se, as shown in FIG. 3, it will be seen that the various rolls which support the belts are all parallel to each other, and certain portions of the courses of the belts likewise are parallel to each other, and these items, in general, are disposed substantially vertically. However, by reference particularly to FIGS. 1 and 2, the preferred disposition of the longitudinal axis of the harvesting attachment 16 relative to the forward end of the receiving and elevating chute 12 of the combine 10 is at an acute angle to the plane of the soil or ground relative to which the combine and harvesting attachment move. As illustrated, this angle is somewhat of the order of about 15°, but it is to be understood that this specific illustration is not to be regarded as restrictive, since the angle may be adjusted within reasonable limits. Such adjustment may be accomplished, for example, by lengthening or shortening the supporting means for the upper rearward portion of the attachment 16, such adjusting means specifically being illustrated in the present drawings as comprising a pair of chains 102. The forward ends of the chains are connected to suitable brackets 104 connected to the overhead frame 26, and the rearward ends of the chains are connected to any appropriate means on the combine. As shown in exemplary manner in FIG. 1, one means for lengthening and shortening the chains 102 may comprise turnbuckles 106.

The forward end of the harvesting attachment 16 preferably is provided with a pair of guide shoes 108 which are rigidly connected, for example, to the lower ends of the forwardmost cantilever members 46 and 50, as best shown in FIGS. 2-4. The shoes 108 may be provided with appropriate brace members 110, if desired. The forward ends of the shoes are curved upwardly as convenient, in the manner generally illustrated in FIG. 2, so as to permit smooth sliding movement of the shoes relative to the ground over which they pass, and thereby relieve strain upon the supporting chains 102, the principal function of the chains 102, under such circumstances, being to limit the forward downward movement of the attachment 16, especially since limited pivotal movement is afforded the attachment by the bolts 44 carried by brackets 18 of the forward end of the elevating chute 12 of the combine. Further, the distance between the shoes 108 and the lower edges of the forward portions of the endless belts 92 and 94 is relatively short, preferably being only the matter of several inches at the most, because it is desired to have the forward lower ends of said belts as close to the ground as conveniently possible in order that as much of the bean vines, and especially the foliage and pod portions thereof, as possible may be enveloped particularly between the parallel portions 96 of the belt. Further, the vertical width of the belts 92 and 94 is substantial and, by way of example only, is of the order of 18" or 20". In any event, the width of the belt should be adequate to accommodate, and preferably completely envelop, at least at their upper portions, the standing bean vines of most types which are contemplated for harvest by the present invention, these being vines which preferably mature in the field, in substantially dry state, such beans being harvested when the beans are mature. Particularly when the beans are dried while standing in the field, they readily are capable of being threshed directly as a result of being harvested by the harvesting attachment comprising the present invention which passes the beans, with a minimum of shattering and maximum retention and preservation of any incidentally shelled beans, directly to the receiving and elevating means at the forward end of a conventional bean combine.

The belts 92 and 94 are driven, in the direction of the arrows shown in FIG. 3, so that the preferably parallel portions 96 of the belts travel rearwardly in the same direction and substantially at the same speed, considered relative to the direction of movement of the combine and harvester attachment along a row of beans being harvested thereby. One exemplary means of effecting such driving of the belts is illustrated particularly in FIGS. 2 and 3, the same comprising a pair of motors 112 and 114. These motors preferably are operated by hydraulic fluid under pressure, because most modern tractors and threshing combines and the like are provided with hydraulic pump mechanisms for operating various elements and devices on such apparatus and machines. However, it is to be understood that the invention is not to be restricted to the employment of hydraulic motors, since the use of other types of power means readily are conceivable and operable in accordance with the principles of the invention. Exemplary hydraulic fluid lines 116 conduct fluid to and from the motors, and extend to the hydraulic pressure means carried by the combine 10, for example. In the particular design shown in FIG. 3, it is contemplated that exhaust fluid from one motor shall be fed to the other motor, but this arrangement is merely arbitrary and not restrictive. Further, if desired, only a single motor, either hydraulic or otherwise, need be employed to drive both of the belts through the means of drive mechanism extending to the belt-operating mechanisms commonly from such single motor.

Simple and appropriate drive means are employed between the motors 112 and 114 and the respective endless flexible belts 92 and 94 driven thereby. For example, appropriate cogwheels 118 are provided on the drive shaft of each motor, and cogwheels 120 are provided on the upper end of each of the axles 84, for example, of the rear belt-supporting rolls 90. Appropriate sprocket chains 122 extend around the cogwheels 118 and 120 on each of the subframes so as to drive the belts 92 and 94 in unison and substantially at the same speeds as described hereinabove.

One of the preferred characteristics of the invention is that the speeds at which the belts 92 and 94 are driven is such that particularly the parallel portions 96 of said belts move rearwardly substantially at twice the speed of the combine and harvesting attachment forwardly relative to a row of beans being harvested by each of the units of the type shown in FIG. 3, for example. In view of such differential in speed between the inner, parallel courses of the belts 92 and 94, and the forward movement of the combine and attachment, in conjunction with the incline of the longitudinal axis of the harvesting attachment with respect to the ground, as illustrated in exemplary manner in FIG. 2, the result produced by such movement of the cooperating belts with respect to a row of bean vines is to pull the bean vines rearwardly and also elevate the same simultaneously with respect to the soil, thus resulting in cleaner removal of the vines from the soil, with a minimum amount of broken root portions remaining in the soil, and with minimum field loss of beans and bean vines, as compared with other speed differentials which have been tried. For example, it has been found that when the speed ratio is substantially less than 2:1, the field losses of beans are too high for a desirable, profitable harvest. Further, when said speed ratio is greater than indicated, there appears to be more tendency to pull the plants out of the soil quickly, whereby there is a greater tendency to break the plants off from the root portions thereof and thus not clean the field to the extent desired. However, it is to be understood that the exact ratio of 2:1 is not to be considered absolutely restrictive, but, rather, as being indicative of the preferred ratio of speeds of the movement of said inner courses of the belts rearwardly with respect to the forward speed of the combine and harvester attachment. Small variations in either direction from this specific ratio can be tolerated within the spirit of the invention.

In accordance wtih the preceding description, it will be seen that each of the sub-frames described has a fixed pivot comprising, for example, the forward cantilever member 46 with respect to one sub-frame, and the rearward cantilever member 48 with respect to the other sub-frame. The opposite ends of these frames are capable of being moved a limited distance laterally, as permitted by the guide slots 54 in the overhead frame members. Such yieldability of at least one end of each of the sub-frames and the belts carried thereby, with respect to the opposite sub-frame and belt carried thereby, permits necessary emergency expansion, as well as average general expansion, especially between the parallel portions 96 of the belts. Bean vines in any given row thereof do not exist in absolute uniform bulk, whereby the bulk in any given row of beans will vary increasingly and decreasingly progressively as the harvesting attachment moves along the row. Such transverse expansion and contraction between the parallel portions 96 of the belts particularly therefore is permitted by means of contracting spring members 124 and 126, which are intreconnected between transversely opposed pairs of the cantilever members 46–52. For reasons obvious from FIG. 3, the spring 124 is longer than the spring 126, due to the provision particularly of the V-shaped forward mouth space 100 between the flexible belts 92 and 94. It also has been found that by providing the support for the sub-frames and flexible belts carried thereby in cantilever fashion solely from the overhead frame 34, adequate gripping of the bean vines is achieved not only to pull the vines rearwardly to separate them readily from the soil but also to elevate the same while especially the foliage and pod portions of the dried bean vines is completely enveloped between the endless flexible belts 92 and 94 which are of adequate height to accomplish such enveloping, in cooperation with the decidedly frictional reticulated surface arrangement 98 provided on the exterior surfaces of the belts which serve not only to provide maximum friction for purposes of pulling and elevating the plants, but also for retaining any shattered beans or at least a very large percentage thereof in order that a maximum and highly profitable amount of the beans and bean vines will be transferred from the field to the receiving and elevating chute 12 of the combine 10.

It also is contempelated in accordance with the present invention that a plurality of the individual harvesting attachment units of the type specifically shown in plan view, for example, in FIG. 3, may be constructed so as to be supported by a common frame attachable to the forward end of a combine, whereby a single combine can be operated to harvest two or more rows of beans simultaneously and thresh the same as the combine moves through the field. An exemplary arrangement of the contemplated type, in which a pair of such attachment uits 16 are provided, although the same are only illustrated in exemplary manner, is shown in FIG. 10. To connect a plurality of such units 16 to a common frame, any suitable construction may be utilized, and if necessary, auxiliary lateral conveyor belts 128 likewise may be employed and suitably driven for purposes of transferring harvested bean vines to the common receiving and elevating chute 12 of the combine, all within the spirit of the present invention.

While the invention has been described and illustrated in its several preferred embodiments, it should be understood that the invention is not to be limited to the precise details herein illustrated and described, since the same may be carried out in other ways falling within the scope of the invention as claimed.

We claim:

1. A dry bean harvesting mechanism attachable to the forward end of a delivery conveyor of a portable thresher and operable to engage and harvest standing dried bean vines having the pods still attached, said mechanism comprising a pair of endless flexible belts of substantial width at least equal to the height of such standing dried bean vines, an overhead frame attachable to the forward end of a portable thresher, a pair of elongated sub-frames extending generally longitudinally of the path of movement of the thresher to which said mechanism is attachable and extending substantially vertically downward from said overhead frame a distance substantially equal to the width of said belts, means connecting the upper portions of said sub-frames to said overhead frame for sole support thereby, said sub-frames each comprising upper and lower substantially parallel frame means, a plurality of rollers extending vertically between said frame means adjacent opposite ends of said sub-frames and rotatably supported thereby to support said belts for movement of adjacent courses of said belts in close engagement with each other and the lower edges of the forward portions of said courses being close to the ground, whereby said courses respectively engage opposite sides of a row of beans and substantially completely envelop the same while the belts frictionally engage said vines from opposite sides, means to drive said belts in directions to move said coures thereof in the same direction rearwardly from the forward ends thereof and at the same speed, and means interconnected to the upper portions of said sub-frames and operable to urge the same yieldably and transversely toward each other to maintain said adjacent courses of said belts substantially parallel to each other and in firm frictional engagement with bean vines to be harvested by said mechanism.

2. The harvesting mechanism according to claim 1 further characterized by said belts being impervious and having outer surfaces provided with recesses defined by intersecting ridges, thereby facilitating the gripping of the bean vines and the recesses affording means to retain any beans which shatter from the vines while being engaged by said belts.

3. The harvesting mechanism according to claim 1 further characterized by said overhead frame including a pair of substantially horizontal frame means extending transversely to the direction of travel of said harvesting mechanism and spaced apart longitudinally, each of said sub-frames being pivotally supported by one of said horizontal frame means and guided for limited lateral movement by the other horizontal frame means.

4. The harvesting mechanism according to claim 3 further characterized by each of said sub-frames being pivotally connected inwardly from one end thereof to one of said pair of substantially horizontal frame means, and said sub-frames each having a pair of cantilever type members projecting upward therefrom adjacent the opposite ends thereof and one of said members on each sub-frame extending through arcuate opening means in one of said substantially horizontal frame means.

5. The harvesting mechanism according to claim 3 further characterized by said overhead horizontal frame means each having vertically spaced supporting means having axially aligned openings therein and said cantilever type members comrising elongated shaft means extending through said axially aligned openings in said frame means and also extending substantially vertically through said sub-frames for the full width of the belts supported thereby to provide firm cantilever support for said sub-frames by said overhead frame.

6. The harvesting mechanism according to claim 1 further including a plurality of members interconnected to said overhead frame and depending therefrom, said members extending vertically substantially through said sub-frames to the lower frame members at locations spaced longitudinally of said sub-frames and supporting said sub-frames and the belts thereon in cantilever manner, whereby vines to be harvested by said mechanism pass into engagement with said belts freely between the bottom edges of said belts.

7. The harvesting mechanism according to claim 6 further characterized by one of said depending members on each sub-frame being fixed relative to said overhead frame to comprise a pivotal axis for one end of each sub-frame and another member on each sub-frame being movable in guide means on said overhead frame to confine the movement of the other end of said sub-frames relative to said overhead frame and each other.

8. The harvesting machine according to claim 7 further characterized by said stationary depending member on one sub-frame being supported by the forward portion of said overhead frame and the stationary depending member on the other sub-frame being supported by the rearward portion of said overhead frame.

9. The harvesting mechanism according to claim 1 further including power means carried by at least one of said sub-frames, and means interconnnecting said power means to at least one roller on each sub-frame and operable to drive the same and the belts which engage the rollers to effect harvesting of vines by said belts.

References Cited by the Examiner

UNITED STATES PATENTS

| 1,506,398 | 8/24 | Wellton | 171—61 X |
| 2,554,066 | 5/51 | Silva | 171—61 X |
| 2,973,816 | 3/61 | Van Der Lely et al. | 171—61 X |

FOREIGN PATENTS

| 863,144 | 1/53 | Germany. |

T. GRAHAM CRAVER, *Primary Examiner.*

ANTONIO F. GUIDA, *Examiner.*